United States Patent [19]

Surles et al.

[11] Patent Number: 5,199,492
[45] Date of Patent: Apr. 6, 1993

[54] SAND CONSOLIDATION METHODS

[75] Inventors: Billy W. Surles, Houston; Philip D. Fader, Katy; Robert H. Friedman, Houston; Carlos W. Pardo, Missouri City, all of Tex.

[73] Assignee: Texaco Inc., White Plains, N.Y.

[21] Appl. No.: 762,150

[22] Filed: Sep. 19, 1991

[51] Int. Cl.$^5$ ............................................. F21B 33/138
[52] U.S. Cl. ..................................... 166/295; 166/300
[58] Field of Search ............... 166/276, 294, 295, 300; 523/131

[56] References Cited

U.S. PATENT DOCUMENTS

| | | | |
|---|---|---|---|
| 3,087,544 | 4/1963 | Forsman | 166/295 |
| 3,373,812 | 3/1968 | Smith | 166/295 X |
| 3,416,603 | 12/1968 | Bernard | 166/295 |
| 3,470,957 | 10/1969 | Hamilton | 166/295 |
| 4,842,072 | 6/1989 | Friedman et al. | 166/295 |
| 4,903,770 | 2/1990 | Friedman et al. | 166/295 X |
| 4,938,287 | 7/1990 | Friedman et al. | 166/295 X |
| 5,005,648 | 4/1991 | Friedman et al. | 166/295 |

Primary Examiner—George A. Suchfield
Attorney, Agent, or Firm—James L. Bailey; Jack H. Park

[57] ABSTRACT

Methods are provided for consolidating unconsolidated mineral grains such as sand within a subterranean oil formation to form a fluid permeable barrier which restrains the movement of sand particles when oil passes through the barrier. A quantity of an organic solvent, preferably an ester such as butyl acetate is injected into the formation as a preflush. Next, a liquid comprising a polymerizable oligomer such as furfuryl alcohol oligomer, an ester such as butyl acetate, and an acid catalyst such as toluene sulfonic acid is provided, then mixed with a noncondensable gas to form a multiphase or aerosol treating fluid, and the treating fluid is injected into the formation to be consolidated. The well is shut in for sufficient period of time for polymerization to convert the injected fluids into a permeable barrier around the wellbore.

20 Claims, No Drawings

SAND CONSOLIDATION METHODS

REFERENCE TO COPENDING APPLICATION

This application is related to Pending application Ser. No. 07/718,513 filed June 21, 1991 for SAND CONSOLIDATION METHODS.

FIELD OF THE INVENTION

This invention concerns a method for treating wells completed in subterranean formations containing unconsolidated particulate matter, e.g. unconsolidated sand, in order to bind the unconsolidated sand grains together in the portions of the formation immediately adjacent to the perforations of the well, and thereby form a stable yet still fluid permeable barrier around the wellbore, in order to facilitate production of fluids from the formation while restraining the movement of sand into the wellbore during the fluid production phase. In particular, preferred embodiments of this invention permit consolidating sand in wells completed in formations whose temperatures are below 350° F. (177° C.) with set times below 24 hours, using an aerosol made with furfuryl alcohol resin, ester, acid catalyst and a noncondensable gas such as air or nitrogen.

BACKGROUND OF THE INVENTION

Sand consolidation is a well known term applying to procedures routinely practiced in the commercial production of petroleum, whereby wells are treated in order to reduce a problem generally referred to as sand production. When wells are completed in petroleum-containing formations, which formations also contain unconsolidated granular mineral material such as sand or gravel, production of fluids from the formation causes the flow of the particulate matter, e.g. sand, into the wellbore, which often leads to any of several difficult and expensive problems. Sometimes a well will "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well. All of these problems are known to exist and many methods have been disclosed in the prior art and applied in oil fields in order to reduce or eliminate production of unconsolidated sand from a petroleum formation during the course of oil production.

The above-described problem and potential solutions to the problem have been the subject of extensive research by the petroleum industry in the hope of developing techniques which minimize or eliminate the flow of sand particles into the producing well and associated equipment during the course of producing fluids from the formation. One such general approach suggested in the prior art involves consolidating the porous but unconsolidated sand structure around the wellbore in order to cement the loose sand grains together, thereby forming a permeable mass which will allow production of fluids from the formation into the well but which will restrain the movement of sand particles into the wellbore. The objective of such procedures is to create a permeable barrier or sieve adjacent to the perforations or other openings in the well casing which establish communication between the production formation and the production tubing, which allows petroleum to flow into the well but restrains the flow of loose particulate mineral matter such as sand. Another approach involves removing a portion of the formation around the well and packing specially prepared granular material into the formation around the wellbore which is subsequently caused to be cemented together in a manner which maintains fluid permeability.

An important quality of a satisfactory sand consolidation method is durability of the permeable barrier formed around the wellbore. Once the barrier is formed and the well is placed on production, there will be a substantial continuing flow of fluids through the flow channels within the permeable barrier, and it is important that the barrier last for a significant period of time, e.g. several months and preferably years, without excessive abrasive wear or other deterioration of the consolidation matrix which would cause the particulate matter to flow once again into the wellbore. At the same time, all sand consolidation treatments eventually fail and must be replaced. To accommodate this need, the sand consolidation must not be excessively difficult to remove when it is desired to perform a new consolidation.

It is also important that the sand consolidating material injected into the formation should be essentially unreactive during the period it is inside the wellbore, i.e. while it is being pumped down the well and positioned where it is desired adjacent to the perforations of the production casing. It is this desire to delay the consolidation reaction that has lead to multi-step procedures in which a catalyst is injected into the formation in one fluid, after which the polymerizable resin containing fluid is injected. While this reduces the propensity for the fluid to polymerize in the wellbore, it does give rise to several new problems which constitute inherent weaknesses in many prior art methods for accomplishing sand consolidation. First, each separate injection step increases the time and cost associated with the well treatment by which sand consolidation is accomplished. Second, injection of catalyst into the formation in advance of the polymerizable fluid does not accomplish uniform mixing of catalyst with all of the polymerizable fluid which is needed to ensure optimum polymerization of the resin, which is essential for strength and durability of the consolidated mass.

PRIOR ART

Many materials have been utilized for consolidating sand in the formation adjacent to production of wellbores. One of the more successful agents utilized for this purpose is furfuryl alcohol resin which can be polymerized to form a solid matrix which binds the sand grains together, while at the same time offering superior resistance to high temperatures and to caustic substances which may be encountered in steam flood operations. One of the problems in utilizing furfuryl alcohol resin to polymerize in the formation for the purpose of consolidating sand grains is in accomplishing uniform catalysis of the polymerization. Many catalysts that are otherwise effective for polymerizing furfuryl alcohol resins cannot be admixed with the furfuryl alcohol to permit single fluid containing both resin and catalyst to be injected into th formation, because the time of polymerization is so short or unpredictable that there is excessive danger that the resin will polymerize in the injection wellbore.

In my U.S. No. 4,427,069 there is disclosed a procedure for consolidating sand in a formation adjacent to a wellbore using an oligomer of furfuryl alcohol, in which the catalyst used is a water soluble acidic salt, preferably zirconyl chloride, which is injected in an aqueous solution into the formation prior to the resin containing fluid injection. The salt adsorbs on the sand grains, and sufficient acidic salt remains absorbed on the sand grain during the subsequent resin fluid injection stage that adequate polymerization occurs. Although this has been very effective in many difficult situations where sand consolidation procedures are utilized, the procedure nevertheless requires a multi-fluid injection procedure which requires more time and is more expensive than is desired. Also, although catalyst mixes with the subsequently injected polymer to a limited degree, usually sufficient to cause some polymerization, it is believed that improved performance would result if the catalyst resin mixture can be made more homogenous prior to polymerization, in order to achieve a dense strong durable consolidation mass.

In U.S. Pat. No. 4,842,072 for "SAND CONSOLIDATION" we disclosed a particularly effective method for consolidating sand utilizing a mixture of a polymerizable resin such as an oligomer of furfuryl alcohol and a diluent such as butyl acetate and an oil soluble, slightly water soluble acid catalyst such as orthonitrobenzoic acid followed by injection of salt water to reestablish permeability.

In U.S. No. 4,669,543 which issued June 2, 1987, there is described a method for consolidating sand using an acid curable resin and utilizing as a catalyst, the reaction product of an acid, and an alkyl metal or ammonia molybdate. In that instance, the catalyst is incorporated in an aqueous carrier fluid which comprises the continuous phase of an emulsion in which the polymerizable resin is the dispersed or discontinuous phase. Thus this process requires that the emulsion be resolved or broken after it is located in the portion of the formation where the permeable consolidating mass is desired, which is sometimes difficult to achieve to the degree of completion necessary to accomplish the desired strong durable consolidating matrix necessary for a long lasting sand consolidation process.

U.S. No. 5,010,953 which issued Apr. 30, 1991 teaches a sand consolidating process using a polymerizable compound such as furfuryl alcohol, a diluent such as a low molecular weight alcohol, an acid catalyst and as an additive to reduce shrinkage, a copolymer of starch and a synthetic polymer such as acrylamide or acrylate.

U.S. No. 5,005,647 which issued Apr. 9, 1991, discloses a process for shutting off permeable zones in wellbores to reduce excess water flow using fluids similar to that described in U.S. No. 5,010,953 discussed above.

U.S. No. 5,005,648 which issued Apr. 5, 1991 describes a method of treating permeable zones in a formation to reduce water flow into a well completed therein by injecting a fluid-containing polymerizable compound, an ester, an acid catalyst such as orthonitrobenzoic acid or toluenesulfonic acid.

U.S. No. 4,938,287 which issued July 3, 1990 describes an oil recovery process in which a preflush such as ethyl or butyl acetate is injected into the sand to be consolidated to remove oily residue, followed by injecting the treating fluid containing the polymerizable resin, diluent, ester and acid catalyst to accomplish sand consolidation.

U.S. No. 4,842,072 which issued June 27, 1989 describes a sand consolidation process using a single treating fluid comprising a polymerizable compound such as furfuryl alcohol, a diluent such as butyl acetate, and an acid catalyst, preferably orthonitrobenzoic acid injected into a zone followed by injecting salt water.

U.S. Pat. No. 5,040,604 which issued Aug. 20, 1991 discloses a sand consolidation method which employs a compound which undergoes acid catalyzed polymerization such as furfuryl alcohol oligomer and an anhydride of a strong acid such as phosphorous tribromide mixed with methyl isobutyl ketone.

In U.S. Pat. No. 4,903,770 for "SAND CONSOLIDATION" we disclosed a preferred process which is more easily removed after a period of use and which is quite inexpensive. The process employs a fluid comprising a polymerizable monomer such as furfuryl alcohol and as a diluent, a polar organic solvent such as methanol and a strong, non-volatile acid catalyst such as sulfuric acid, mixed with steam to form a multiphase or aerosol treating fluid, and injected into the formation to be consolidated. An ester such as ethyl or butyl acetate is incorporated in the fluid when the steam quality is less than 80 percent.

The above described process has been very successful in treating wells in formations being stimulated by steam injection, and provides an inexpensive and durable sand consolidation method which is useable in subsequent steam injections without the deterioration that is frequently encountered during steam flooding.

Many wells exist which could benefit from the furfuryl alcohol aerosol treating process described above, but steam is not readily available in the oil fields, and the cost to apply the process is prohibitively high if it requires that a steam generator be provided in the field where it is otherwise not required and not present. Accordingly, there exist a substantial unsatisfied need for a method for consolidating unconsolidated sand formations using an aerosol multiphase fluid containing a furfuryl alcohol derivative where steam is not readily available.

SUMMARY OF THE INVENTION

We have discovered methods for consolidating sand in subterranean formations whose temperatures are less than about 300° F., and where steam is not readily available. This process requires two steps to accomplish satisfactory consolidation. Initially, a liquid phase fluid comprising an ester, preferably butyl acetate is injected, to remove hydrocarbon materials coating the sand grains that might interfere with the subsequent sand consolidation operation, and to displace residual water away from the wellbore. Next a multiphase aerosol containing a furfuryl alcohol derivative, an acid catalyst, and a noncondensable gas is formed and injected into the formation. In preparing the aerosol treating fluid, an aqueous sand consolidating liquid comprising from 20 to 80 and preferably about 40 percent of an acid catalyzable resin, preferably an oligomer of furfuryl alcohol and from 80 to 20 and preferably about 60 percent of an ester, preferably butyl acetate, plus an effective amount of an acid catalyst is prepared. The pK and concentration of the acid utilized as the catalyst is determined by the downhole temperature of the sand containing formation being treated. About 1.5 percent toluene sulfonic acid is used in a 200° F. well, whereas about 2.5 percent toluene sulfonic acid is used if the downhole well temperature is about 100° F. The aqueous liquid solution comprising the oligomer, the ester and the acid catalyst is sprayed via a nozzle into by a flowing stream of a noncondensable gas such as nitrogen or air to form an aerosol, which is a multiphase fluid comprising discontinuous liquid phase and a continuous gaseous phase. The aerosol treating fluid is injected into the formation. The injected aerosol treating fluid displaces the previous injected preflush, and deposits the polymerizable compound on the sand grains, and thereby accomplishing a thorough coating of the sand grains with the oligomer catalyst mixture. The continuous passage of the noncondensable gas phase through the treating zone maintains permeability, while the accumulated oligomer-catalyst mixture on the sand grains accomplishes the desired cementing of the sand grains together. After sufficient treating fluid has been injected into the well to insure that the sand grains are fully coated in a zone which runs from 3 to 12 inches from the wellbore face, the well is shut in for a period of 1 to 16 hours. This procedure results in the formation of a permeable, durable consolidated sand mass around the perforations of the wellbore, which restrains the movement of sand into the wellbore during production operations, while permitting relatively free flow of formation fluids, particularly petroleum, into the wellbore.

DESCRIPTION OF THE PREFERRED EMBODIMENTS

We have discovered, and this constitutes our invention, that it is possible to accomplish improved sand consolidation methods utilizing the sand naturally occurring in the formation or sand which has been placed in the formation in a step prior to the preflush injection step in a process employing a two step injection process. First a preflush fluid comprising an ester, preferably butyl acetate, is introduced into the formation to clean the sand grains and to displace residual fluids away from the well. Next a multiphase fluid comprising a mixture of a noncondensable gas, polymerizable compound, a catalyst for the polymerization of the compound, and as a diluent and reaction modifier, an ester such as butyl acetate is injected into the formation to enter the void space in the portion of the formation adjacent to the production well.

The injection of noncondensable gas and polymerization chemicals is roughly analogous to a spray painting operation applied to a wire screen, where the wires are coated but the holes remain open. This method accomplishes coating the formation granular material, e.g. the formation sand, with the mixture of polymerizable oligomer and catalyst.

The polymerizable oligomer which we have found to be especially preferable for use in our sand consolidation reaction is an oligomer of furfuryl alcohol. Any oligomer which will polymerize at formation temperature with an acid catalyst can be used in this process; however, a fluid comprising an oligomer of furfuryl alcohol $(C_4H_3OCH_2O)_n$ is the particularly preferred polymerizable oligomer. This material has the advantage of being relatively inexpensive and having the characteristic of autopolymerizing on exposure to acid catalyst, forming a thermal setting resin which cures to an insoluble mass that is highly resistant to chemical attack as well as to thermal degradation. A preferred commercial product for this application is QO Chemicals QUACOOR 1300 ® Furan Resin. Although we found and previously reported that a monomer of furfuryl alcohol is a preferred material when a similar process is applied using steam to form the aerosol mixture, we have found that the monomer is not suitable in the present invention where the aerosol is formulated by spraying the acid catalyzable compound with the noncondensable gas at essentially surface ambient temperatures. The steam aerosol system required 300° F. or greater temperatures to begin the polymerization of the furfuryl alcohol monomer before it hits the sand face, as the less viscous monomer will not adhere to the sand grains in the formations, and so a satisfactory consolidation process can not be achieved. Attempts were made to compensate for this by increasing the amount of catalyst used in the fluid containing furfuryl alcohol monomer and acid catalyst in the preparation of the steam monomer aerosol, but it was found that the furfuryl alcohol monomer was too reactive to control at mixing and injection conditions.

The gas utilized in formulating the aerosol mixture can be any available gas which is noncondensable at injection and formation conditions. Compressed air is the most likely candidate because it is inexpensive and widely available. Nitrogen may also be used for this purpose. Although other gases might be used, air and nitrogen are the gases of choice because of availability and economy.

During the treating fluid injecting step the mixture of gas, oligomer, diluent and catalyst enters the formation as an aerosol with gas comprising the gaseous continuous phase and dispersed drops of oligomer and acid comprising the dispersed phase. The multiphase mixture is usually somewhat above surface ambient temperature due to the heating affect of compressing the gas, which may be more or less than the formation temperature. Drops of oligomer and acid condense on the sand grains, which merge to form a liquid coating on the sand grains having sufficient thickness to bind the sand grains together. Polymerization occurs quickly in this liquid film, the reaction rate being roughly first order with monomer concentration and pH. At 200° F. the polymerization occurs in a matter of minutes, while the mixture of oligomer and acid are stable and unreactive at surface conditions of 75° F. for several days.

Our methods are preferably accomplished using the following materials and procedures. Our invention is especially suitable for application to formations containing unconsolidated sand and relatively high API gravity oil which ordinarily does not require steam stimulation to achieve commercial oil recovery rates.

It is necessary that a source of noncondensable gas be available at or near the well. Usually the most convenient way of forming the aerosol treating fluid used in the process of our invention is with the use of a conventional air compressor, and spraying the liquid oligomer containing material through an injection nipple to accomplish an even dispersal of the liquid resin in the gas stream. By proper choice of the injection nozzle diameter liquid pressure and the air pressure, it is possible to form a fairly fine spray containing relatively even droplet size distribution in the compressed air. As a general rule, satisfactory results are achieved if the liquid is injected through a ¼ to ⅜ inch nozzle when the liquid injection pressure is from 100 to 300 pounds per square inch, when injected into a gas steam whose flow rate is from 2.2 to 3.3 SCF per hour.

We have found that the preferred aerosol can be formulated if a mixture of the furfuryl alcohol oligomer, e.g. the QUACOOR 1300 ® Furan Resin is mixed with an ester, usually the same ester as is utilized in the preflush step. Although the ratio of the polymerizable resin to ester may vary depending on the surface ambient temperature and the available gas pressure, we have found that the preferred results are obtained by using from 20 to 70 and preferably from 40 to 60 percent of the acid catalyzable furfuryl alcohol oligomer mixed with an ester, preferably butyl acetate. The predetermined concentration and choice of acid catalyst is mixed with the resin ester mixture before the aerosol mixture is formulated, as described below.

The furfuryl alcohol oligomer emulsion utilized in our process is so viscous that it must be diluted with an appropriate solvent in order to permit it to be pumped into the formation, and to accomplish relatively complete coating of the sand grains in the formation. Any solvent for the furfuryl alcohol oligomer would accomplish this objective. It is possible, however, to accomplish this and another more important objective by using as the diluent a hydrolyzable ester. The polymerization of the furfuryl alcohol oligomer produces water and the water produced by polymerization suppresses the polymerization reaction. If water produced during polymerization of furfuryl alcohol oligomer can be removed, it is possible to force the polymerization reaction to proceed further toward completion and thereby produce longer polymer chains than would result if water were left in the polymer reaction mass. A hydrolyzable ester will remove water as it is produced, leading to the formation of longer chain polymers which result in a stronger, more durable polymer matrix which binds the sand grains together. Accordingly, our preferred diluent for the furfuryl alcohol oligomer is a hydrolyzable ester, and our especially preferred species is butyl acetate or ethyl acetate or mixtures thereof.

It is essential for this procedure that the acid catalyst utilized be oil soluble so that it may be incorporated in the resin solvent solution. This permits thorough mixing of the catalyst which is essential in order to ensure that the polymerization reaction occurs uniformly throughout the entire mass of sand consolidation chemical placed in the formation. Prior art methods which utilize a catalyst injected in a non-miscible fluid either before or after injection of the fluid containing the polymerizable resin, or present in a non-miscible phase of the polymer fluid, do not accomplish uniform reactions such as are possible by use of the present soluble catalyst. The catalyst for use in our invention must also exhibit temperature sensitivity such that the catalytic polymerization does not occur during the time that the fluid is prepared and mixed on the surface of the earth and pumped into the formation. It is equally important that once the fluid is placed in the formation and left in a quiescent state for a period of time sufficient to ensure temperature equalization with the formation, that the polymerization reaction occur rapidly in order to permit completion of the procedure in a relatively brief period of time, so the well can be put on production as soon as possible. Because of this dual requirement, the catalyst choice and concentration are both critical to the proper function of our invention.

As stated above, the preferred catalyst for use in our process is one which is oil soluble and very slightly water soluble. While we have previously disclosed that the preferred organic acid catalyst is orthonitrobenzoic acid for processes being applied to relatively high temperature (e.g., greater than 350° F.) formations, we have found that at temperatures less than 350° F. and especially when the formation temperature is below 280° F., orthonitrobenzoic acid is so weak and so insoluble that the time required for polymerization to proceed at least sufficiently far that no displacement of polymer from the sand grain occurs, is in the range of several days to a week or more. This long set time causes several problems. The polymerizable compound, e.g. the furfuryl alcohol, may be washed off the sand grains before polymerization proceeds far enough to render the polymer immobile, which greatly weakens the strength of the polymerized, consolidated sand mass. Also, the total cost of a well treatment is greatly increased by the extended period which the well is shut in, which delays returning the well to production.

We have found that the desired set time of from 0.75 to 4.0 hours and preferably from 1–2 hours can be realized for any particular formation temperature in the range of 40° F. to 300° F. and especially from 60° to 280° F. if the pK of the acid catalyst and the concentration of the acid catalyst are carefully selected.

Once the acid has been selected, the acid concentration should be determined. The concentration of acid to yield the desired 0.75–4.0 hour set time is solely determined by the formation temperature. It is essential in applying our process to a formation that the temperature of the formation be known or measured. The following table gives the relationship between toluenesulfonic acid catalyst concentration and temperature to produce set time within the preferred 1–2 hour range.

TABLE 1

| FORMATION TEMPERATURE °F. | % TOLUENE-SULFONIC ACID |
|---|---|
| Up to 80° F. | 5.0–3.8 |
| 80–120° F. | 3.8–3.1 |
| 120–140° F. | 3.1–2.4 |
| 140–200° F. | 2.4–1.4 |
| 200–230° F. | 1.4–0.8 |
| 230–260° F. | 0.8–0.5 |
| 160–300° F. | 0.50 |

Surprisingly, we have found that the above correlation holds for any mixture ratio of resin and the ester, e.g. butyl acetate, over the volume ratio 20 to 80 to 80 to 20.

One preferred method for forming a particularly effective fluid for use in practicing the process of our invention involves mixing a approximately 50–50 mixture of the resin in its commercial form, which is usually an emulsion, with butyl acetate, after which the toluenesulfonic acid catalyst is dissolved in this mixture of resin and ester.

Since the melting point of toluenesulfonic acid is 223° F. it is sometimes necessary to incorporate the acid in a suitable diluent, usually a low carbon alcohol such as methanol, to facilitate mixing it with the resin emulsion. From 2 to 5 percent methanol is usually adequate for this purpose.

The quantity of the preflush used in the first step and the quality of the sand consolidating liquid comprising the resin, diluent and catalyst used to form the aerosol which is injected into the formation in the second step of our process varies depending on the thickness and porosity of the formation to which the sand consolidation process is to be applied, as well as the diameter of the well and the desired thickness of the permeable barrier in the formation. The thickness an porosity of the formation and the diameter of the well will always be known, and it is ordinarily satisfactory if depth of the penetration is in the range of from 6 to 12 inches from the well bore. As an example, if it is desired to treat a formation whose thickness is 18 feet and porosity is 35% to form a permeable barrier just outside the perforations of the wellbore which is 8 inches thick, and the well being treated is 10 inches in diameter, then the volume of preflush and sand consolidating liquid necessary is calculated according to the example below.

Volume in cubic feet equal $$\frac{\pi\left(\frac{10}{2}+8\right)^2 - \pi\left(\frac{10}{2}\right)^2}{144} \times H \times \text{Porosity} =$$

$$\frac{3.14\,(13)^2 - 3.14\,(5)^2}{144} \times 18 \times (.35)$$

19.79 cubic feet = 148 gallons of the preflush and of the sand consolidating liquid comprising resin, catalyst and ester.

In applying our methods, the sand consolidating liquid described above is mixed with gas on the surface to form the aerosol treating fluid mixture which passes through an injection string and into the formation where consolidation is desired. The consolidating fluid is mixed with gas in a volume ratio in the range of one part sand consolidating liquid to from .2 to 1 and preferably .4 to .6 parts by volume gas.

The mixture of consolidating fluid and gas forms a two-phase mixture, ideally an aerosol, and enters the formation in that form. The droplets of sand consolidating liquid coalesce on the sand grains, forming a liquid coating on the said particles. Since the dispersed drops of liquid in the aerosol treating fluid include the polymerizable oligomer and the acid, the liquid film formed on the sand surface also comprises both oligomer and acid catalyst. As the film forms, the polymerization of oligomer begins due to contact with acid and proceeds very rapidly. The carrier gas portion of the aerosol maintains the void spaces between oligomer-coated sand grains, which insures that the consolidated sand mass will have sufficient permeability to allow oil flow through the treated zone after the coating has cured and oil production has been resumed.

Ordinarily, this aerosol treating fluid is injected relatively fast when using a 1 to 3 inch diameter line in the wellbore carrying treating fluid and gas. Under these conditions the transit time in the injection string will be from 10 to 60 seconds.

EXPERIMENTAL

A vat with a volume of 18 liters was packed with oil saturated Kern formation sand. The cell was then heated to 150° F. A simulated one inch diameter well was provided in the center of the cell. An air line was attached to the well to introduce air into the well. The air line was equipped with valves and check valves to permit introducing the consolidating fluid into the air line to permit mixing of the fluid with the air. A sample comprised of 500 ml of fluid (40% furfuryl alcohol oligomer, 60% butyl acetate, and a 2% admix of toluenesulfonic acid) was mixed with the air and injected into the well into the cell. The volume ratio of fluid to air was 1 to 8. The cell's temperature was maintained at 150° F. for 3 hours. After 3 hours the sand was removed from the cell. A strong permeable consolidated sand mass was present around the well, with an average diameter of 12 inches attached to the perforation in the well.

FIELD EXAMPLE

For the purpose of complete disclosure, including what is now believed to be the best mode for applying the process of our invention, the following pilot field example is supplied.

A producing well is completed in a subterranean petroleum containing formation, from 2,540 to 2,588 feet. The formation temperature is 150° F. Considerable sand production has been experienced in other wells completed in this formation in the past, and so it is contemplated that some treatment must be applied in order to permit oil production from this formation without experiencing the various problems of unconsolidated sand production. This particular well has not been used for oil production, so little sand has been produced from the formation. It is known that the sand is contaminated with formation crude, but is otherwise of a reasonable particle size to accommodate sand consolidation process. It is decided therefore to inject a preflush consisting of butyl acetate followed by injection of the aerosol treating fluid comprising compressed air and the sand consolidation liquid dispersed therein. The aerosol is introduced into the formation immediately adjacent to the perforation of the producing well in order to bind the naturally occurring sand grains together and form a stable mass which forms a permeable barrier to restrain the flow of formation sand into the well while still permitting the free flow of formation fluids including petroleum through the barrier. It is determined that it is sufficient to treat approximately 12 inches into the formation. Based on experience in this field, it is expected that the porosity of the formation to be treated is approximately 40%. The outside casing diameter of the well being treated is ten inches. The volume of preflush and of sand consolidating fluid necessary to treat this portion of formation is determined as follows:

$$\frac{3.14\left(\frac{10}{2}+12\right)^2-3.14\left(\frac{10}{2}\right)^2}{144}\times(0.40)\,(48)\,(0.20) =$$

$$\frac{3.14\,(17)^2-3.14\,(5)^2}{144}\times(.40)\,(48)\,(0.20) =$$

22.12 Cu. Ft. or 165.5 gallons

In order to accomplish adequate contact of the portion of the unconsolidated sand formation adjacent to the production well, a total of 165 gallons preflush and 165 gallons of sand consolidating liquid is required. The preflush step is accomplished by injecting 165 gallons of butyl acetate into the zone to be treated with the aerosol treating method.

The required volume of sand consolidation liquid is formulated by mixing 66 gallons of Q.O. Chemical Company's QUACOOR 1300® with 100.0 gallons of butyl alcohol to which had previously been added 3.3 gallons of toluene sulfonic acid, equivalent to 2.0 percent acid. The sand consolidation liquid is injected into a compressed air line at the wellhead in a ratio of 90 parts air to 10 parts sand consolidating liquid to form an aerosol. This fluid is injected into the formation at a rate of about 45 gallons per hour based on the liquid portion of the aerosol. After all of the treating fluid has been injected into the formation, the well is shut in for 4 hours to ensure complete polymerization of the furfuryl alcohol oligomer coating the sand grains. At the conclusion of this shut-in period, the well is placed on production and essentially sand-free oil production is obtained.

Although our invention has been described in terms of a series of specific preferred embodiments and illustrative examples which applicants believe to include the best mode for applying their invention known to them at the time of this application, it will be recognized to those skilled in the art that various modifications may be made to the composition and methods described herein without departing from the true spirit and scope of our invention which is defined more precisely in the claims appended hereinafter below.

We claim:

1. A method for consolidating unconsolidated mineral particles including sand in a subterranean petroleum formation whose temperature is less than 300° F. penetrated by a well in fluid communication with at least a portion o the formation, comprising:

(a) introducing into the formation a predetermined volume of a preflush fluid comprising an organic diluent to remove residue from the sand grains;

(b) providing a sand consolidating liquid comprising a polymerizable ologomer of furfuryl alcohol, an ester diluent for the oligomer, and toluene sulfonic acid catalyst, the concentration of acid being selected to cause polymerization of the oligomer at formation temperatures in from 1 to 16 hours;

(c) mixing he sand consolidating liquid with a non-condensable gas to form a multi-phase treating fluid;

(d) injecting said multi-phase treating fluid into the formation to coat the sand grains and to occupy the void space of at least a portion of the formation adjacent to the well; and (e) allowing the injected fluids to remain in the formations for a period of time sufficient to accomplish at least partial polymerization of the oligomer, forming a permeable consolidated mass around the wellbore.

2. A method as recited in claim 1 wherein the concentration of the furfuryl alcohol oligomer in the sand consolidation liquid is from 20 to 80 percent by volume based on the total volume of he sand consolidating liquid.

3. A method as recited in claim 1 wherein the concentration of furfuryl alcohol oligomer is from 40 to 60 percent by volume based on the total volume o the sand consolidating liquid.

4. A method as recited in claim 1 wherein the diluent ester is butyl acetate, ethyl acetate or mixtures thereof.

5. A method as recited in claim 4 wherein the ester is butyl acetate.

6. A method as related in claim 4 wherein the ester is ethyl acetate.

7. A method as recited in claim 1 wherein the concentration of ester in the sand consolidating fluid is from 20 to 80 percent by volume.

8. A method as recited in claim 1 wherein the concentration of ester in the sand consolidating liquid is from 40 to 60 percent by volume.

9. A method as recited in claim 1 wherein the concentration of acid catalyst in the sand consolidating liquid is from 0.1 to 5 percent by volume.

10. A method as recited in claim 1 wherein the concentration of acid catalyst in the sand consolidating liquid is from 1 to 4 percent by volume.

11. A method as recited in claim 1 wherein the volume ratio of sand consolidating liquid to gas is from 0.2 to 1.

12. A method as recited in claim 1 wherein the volume of sand consolidating fluid is sufficient to substantially coat the sand grains in the portion of the formation adjacent to the producing well for a distance at least 12 inches from the well.

13. A method as recited in claim 1 wherein the acid content of the sand consolidating fluid is adjusted to cause polymerization to occur after a time slightly greater than the time required for the aerosol consolidating fluid to be injected into the formation.

14. A method as recited in claim 1 wherein the ester is butyl acetate or ethyl acetate, or mixtures thereof.

15. A method as recited in claim 14 wherein the ester is ethyl acetate.

16. A method as recited in claim 1 wherein the fluids are left in the formation for a period of at least 24 hours.

17. A method as recited in claim 14 wherein the ester is butyl acetate.

18. A method as recited in claim 1 wherein the non-condensable gas is selected from the group consisting of air, nitrogen and mixture thereof.

19. A method as recited in claim 18 wherein the non-condensable gas is air.

20. A method as recited in claim 18 wherein the non-condensable gas is nitrogen.

* * * * *

UNITED STATES PATENT AND TRADEMARK OFFICE
CERTIFICATE OF CORRECTION

PATENT NO.   : 5,199,492
DATED        : April 6, 1993
INVENTOR(S)  : Billy Wayne Surles, Philip Daniel Fader, Robert Harold Friedman and Carlos Walter Pardo It is certified that error appears in the above-identified patent and that said Letters Patent is hereby corrected as shown below:

Column 11,
In Claim 1, line 25, please substitute --portion of-- for "portion o".

In Claim 1, line 35, please substitute --mixing the-- for "mixing he".

In Claim 2, line 50, please substitute --of the-- for "of the".

Signed and Sealed this

Twenty-eighth Day of December, 1993

Attest:

BRUCE LEHMAN

*Attesting Officer*    *Commissioner of Patents and Trademarks*